J. B. BARTHOLOMEW.
TRACTOR.
APPLICATION FILED AUG. 1, 1912.

1,199,334.

Patented Sept. 26, 1916.
2 SHEETS—SHEET 1.

Witnesses
H. N. Lybrand
S. Jay Teller

Inventor
John B. Bartholomew
By H. H. Bliss
Attorney

J. B. BARTHOLOMEW.
TRACTOR.
APPLICATION FILED AUG. 1, 1912.

1,199,334.

Patented Sept. 26, 1916.
2 SHEETS—SHEET 2.

Witnesses
H. H. Lybrand
S. Jay Teller

Inventor
John B. Bartholomew
By H. H. Bliss
Attorney

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

TRACTOR.

1,199,334.      Specification of Letters Patent.      Patented Sept. 26, 1916.

Application filed August 1, 1912. Serial No. 712,684.

*To all whom it may concern:*

Be it known that I, JOHN B. BARTHOLOMEW, a citizen of the United States, residing at Peoria, in the county of Peoria and State of Illinois, have invented certain new and useful Improvements in Tractors, of which the following is a specification, reference being had therein to the accompanying drawings.

This invention relates to improvements in tractors provided with internal combustion driving motors, and more particularly relates to the devices for cooling the water used to cool the engine and the devices for handling the exhaust gases.

One of the objects of the invention is to provide a water cooler or radiator adapted to be effective while the tractor is standing still as well as while the tractor is in motion.

Another object of the invention is to provide a radiator adapted to make use of the wind in cooling the water and to be as effective while the wind is in one direction as it is when in another.

A further object is to provide a radiator so related to the devices for handling the exhaust gases that the gases will cause a draft of cool air through the radiator elements.

Figure 1:
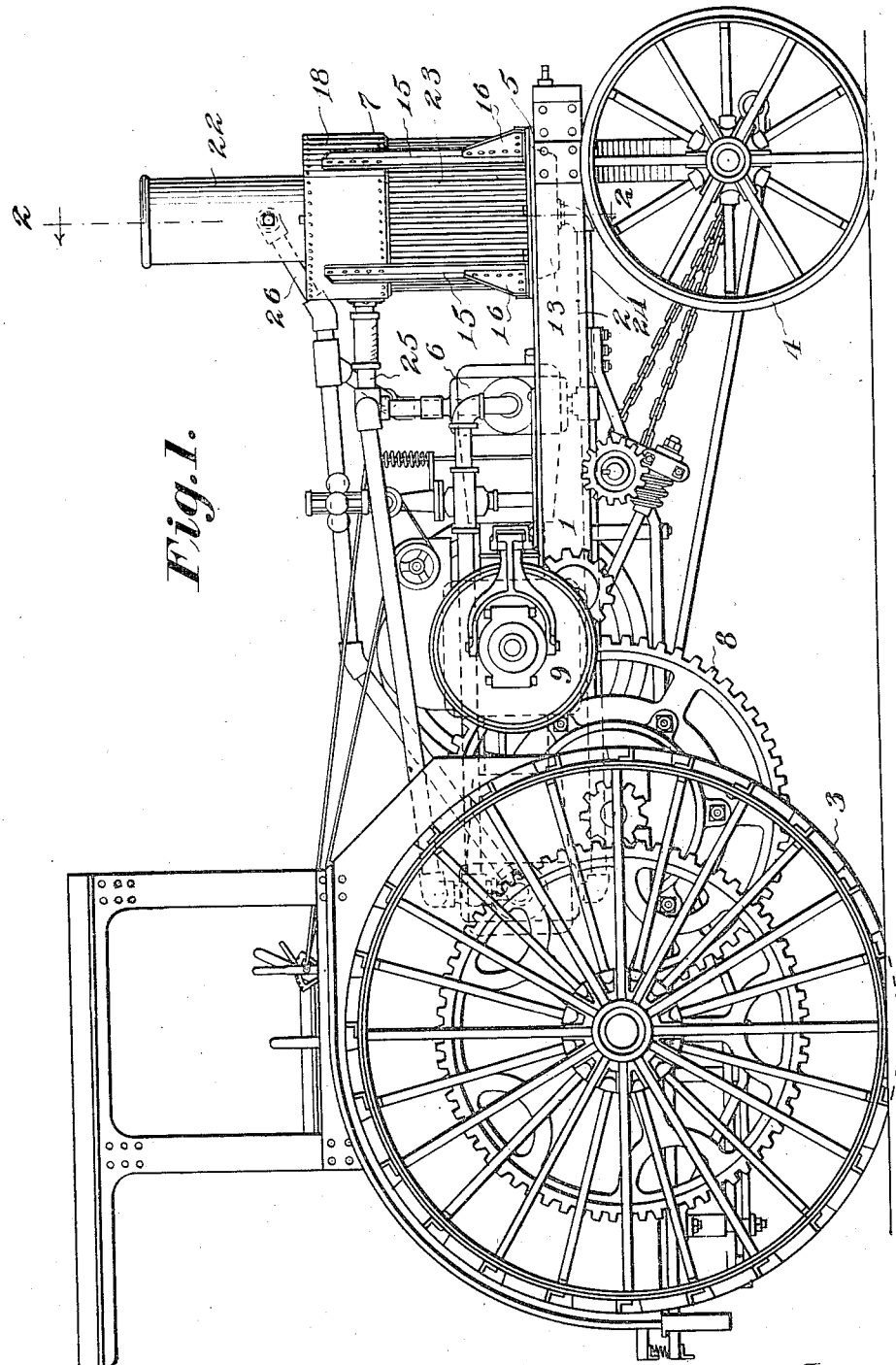
Figure 2:
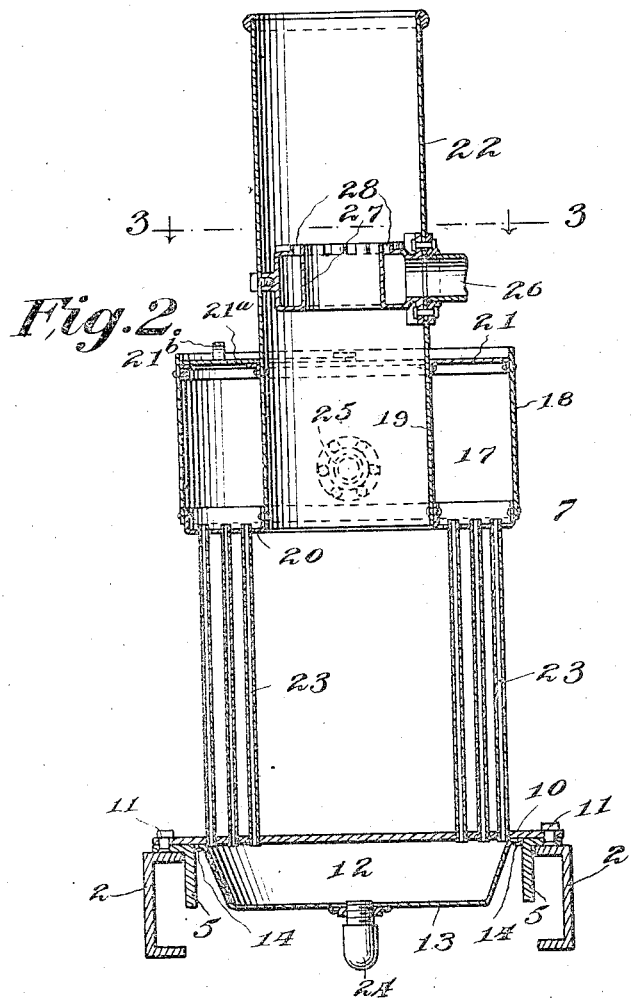
Figure 3:
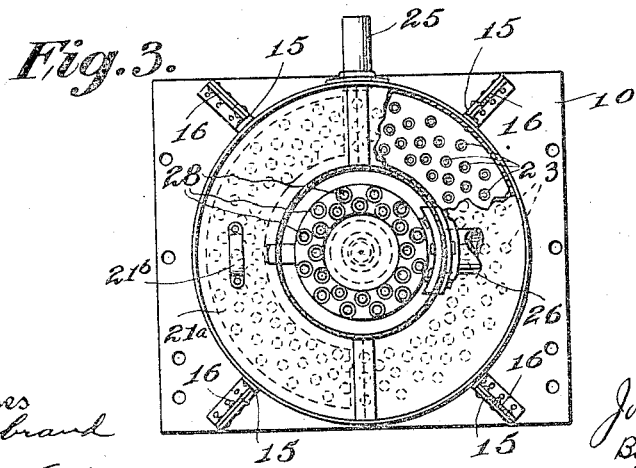

Further objects will be apparent from the following specification and claims:

Of the drawings which illustrate one embodiment of my invention, Figure 1 is a side elevation, Fig. 2 is a fragmentary sectional view taken along the line 2—2 of Fig. 1. Fig. 3 is a plan view partly in section along the line 3—3 of Fig. 2.

Referring to the drawings, 1 represents as a whole the main frame of the tractor. This frame comprises two parallel side elements 2, 2. The frame is mounted upon the rear driving wheels 3 and the front steering wheels 4.

Mounted on the main frame 1 is a supplemental or power plant frame comprising parallel side elements 5, 5 which rest upon the corresponding frame elements 2, 2 and are longitudinally slidable with respect thereto. Upon the elements 5, 5 of the power plant frame are mounted all of the power plant parts including the engine which is indicated as a whole by 6, and the radiator which is indicated as a whole by 7. The engine can be connected with the drive wheels by means of suitable gearing 8 and a suitable clutch 9. The arrangement is preferably such that when the power plant frame is in one extreme of its movement, connection will be established from the engine through the gearing 8 to the drive wheels, and when the power plant frame is in the other extreme of its movement, the power connection through the gearing will be broken. It will be understood that the whole power plant, including the radiator, moves when the power connection is made or broken.

The radiator 7 preferably has a main rectangular base plate 10 which is connected by means of bolts or rivets 11, 11 to the power plant frame elements 5, 5. This plate 10, in addition to forming a support for the other parts to be described, also serves as the upper wall of the lower head or reservoir 12. Side and bottom walls of this reservoir are preferably formed from a single piece of metal 13 which is horizontally flanged at its upper peripheral part and connected to the plate 10 by means of rivets 14, 14.

Mounted on the plate 10 are four upright struts or braces 15, 15, these being suitably connected to the base plate and braced by means of angle plates 16, 16. Secured to the upright struts or braces 15, 15 is the upper head or drum 17 which is annular in shape, it being provided with the outer cylindrical wall 18, the inner cylindrical wall 19, the bottom wall 20 and the top wall 21. Preferably the inner cylindrical wall 19 is extended upward a considerable distance above the top wall 21 to form a stack 22. Preferably a part 21ª of the top wall 21 is removable to permit the head or reservoir 18 to be filled with water. The removable part 21ª is provided with a handle 21ᵇ.

Extending between the lower head or reservoir 12 and the upper head or reservoir 17 are pipes or flues 23, 23, these preferably being arranged in a series of circular rows. Each pipe or flue 23 extends through suitably positioned apertures in the wall 20 and in the plate 10 thus establishing communication between the upper and lower heads.

A pipe 24 communicates with the head or reservoir 12 preferably at its lower part and this pipe leads to the cooling jackets for the cylinders of the engine 6. A second pipe 25 serves to lead the heated water back from the jackets to the upper head or reservoir 17 of the radiator.

26 is a pipe for leading the exhaust gases away from the engine cylinders. This pipe terminates in an exhaust head 27 which is located in the stack 22. This exhaust head is preferably annular in shape and its upper annular wall is provided with a series of annular openings 28, 28 through which the exhaust gases are discharged in a plurality of upward directed streams circumferentially arranged with respect to the stack. These streams of heated rapidly moving gas serve to induce a draft of air upward through the stack, the air reaching the stack being necessarily drawn inward between the flues 23.

In operation the cool water passes through the pipe 24 to the cylinder jackets where it is heated and from which it passes through the pipe 25 to the upper head or reservoir 17. Here the water may remain for some minutes and be partly cooled by contact with the walls of the reservoir, especially the walls 18 and 19. The wall 18 is cooled by the naturally moving atmospheric air, and the wall 19 is cooled by the air drawn upward through the stack by the exhaust gases. The water in the reservoir 17, before it can reach the reservoir 12 and be again used in the cylinder jackets, must pass downward through the pipes or flues 23. In passing through these flues it is very effectively and completely cooled as these flues are so arranged that the atmospheric air can very freely circulate between them regardless of the motion of the tractor and regardless of the direction of the wind. These flues are not inclosed in any housing, boxing or jacket but are exposed on all sides and have their external surfaces directly exposed to a normal atmosphere and the wind from any direction can freely pass between them. In saying that the external surfaces of the pipes are exposed to the normal atmosphere, I refer to the fact that they are not surrounded by a casing or boxing, possibly inclosing a body of air, but that the atmosphere, generally, can have access to, and contact with, them. Furthermore, on account of the induced draft upward through the stack 22, there is always an inward movement of air between the flues, this inward movement taking place irrespective of the direction or strength of the wind. By removing the cover 21ª additional water can easily be supplied at any time to replace losses from leakage or other causes.

I claim:

1. In a tractor, the combination with a frame and supporting wheels therefor, of an internal combustion engine mounted upon the frame and provided with cylinders having cooling jackets, a plurality of vertical pipes each of relatively small diameter mounted on the frame and grouped about an unobstructed central vertical space and having their external surfaces directly exposed to the normal atmosphere, water conducting means for connecting the pipes with the cylinder jackets whereby a circulation of water may be maintained through the jackets and through the pipes, and means positioned outside of the said unobstructed space, but in vertical registry therewith for causing a draft of air from the said central space along lines parallel to the pipes whereby air is caused to move inward between the pipes to replace the air withdrawn from the central space.

2. In a tractor, the combination with a frame and supporting wheels therefor, of an internal combustion engine mounted upon the frame and provided with cylinders having cooling jackets, a plurality of vertical pipes each of relatively small diameter mounted on the frame and grouped about an unobstructed central vertical space and having their external surfaces directly exposed to the normal atmosphere, water conducting means for connecting the pipes with the cylinder jackets whereby a circulation of water may be maintained through the jackets and through the pipes, and a vertical draft stack mounted with its lower edge in communication with the said central space for causing a draft of air from the said central space along lines parallel to the pipes whereby air is caused to move inward between the pipes to replace the air withdrawn from the central space.

3. In a tractor, the combination with a frame and supporting wheels therefor, of an internal combustion engine mounted upon the frame and provided with cylinders having cooling jackets, a plurality of vertical pipes each of relatively small diameter mounted on the frame and grouped about an unobstructed central vertical space, and having their external surfaces directly exposed to the normal atmosphere, water conducting means for connecting the pipes with the cylinder jackets whereby a circulation of water may be maintained through the jackets and through the pipes, and a vertical draft stack mounted with its lower edge in communication with the said central space, a pipe connected with the exhaust ports of the engine and with the stack for conducting the exhaust gases into the stack to cause a draft of air from the said central space along lines parallel to the pipes whereby air is caused to move inward between the pipes to replace the air withdrawn from the central space.

4. In a tractor, the combination with a frame and supporting wheels therefor, of an internal combustion engine mounted upon the frame and provided with cylinders having cooling jackets, a plurality of vertical pipes each of relatively small diameter mounted on the frame and grouped about an unobstructed central vertical space and having their external surfaces directly exposed to the normal atmosphere, water conducting means for connecting the pipes with the cylinder jackets whereby a circulation of water may be maintained through the jackets and through the pipes, a vertical draft stack mounted with its lower edge in communication with the said central space, an annular exhaust head located in the stack and provided in its upper wall with a plurality of peripherally arranged openings, a pipe connected with the exhaust ports of the engine and with the exhaust head for conducting the exhaust gases into the stack to cause a draft of air from the said central space along lines parallel to the pipes whereby air is caused to move inward between the pipes to replace the air withdrawn from the central space.

5. In a tractor, the combination with a frame and supporting wheels of an internal combustion engine mounted on the frame and provided with cylinders having cooling jackets, a plurality of vertical cooling pipes each of relatively small diameter grouped about an unobstructed central vertical space and freely exposed to the normal atmosphere in all directions, a reservoir with which all of the pipes are connected at their lower ends, an annular reservoir with which all of the pipes are connected at their upper ends, water conducting means for connecting the cylinder jackets with the upper reservoir and with the lower reservoir, whereby a circulation of water may be maintained through the jackets, through the reservoir and through the pipes, and means for causing a draft of air upward from the said central space through the opening in the upper annular reservoir, whereby air is caused to move inward between the pipes to replace the air withdrawn from the central space.

6. In a tractor, the combination with a frame and supporting wheels of an internal combustion engine mounted on the frame and provided with cylinders having cooling jackets, a plurality of vertical cooling pipes each of relatively small diameter grouped about an unobstructed central vertical space and freely exposed to the normal atmosphere in all directions, a reservoir with which all of the pipes are connected at their lower ends, an annular reservoir with which all of the pipes are connected at their upper ends, water conducting means for connecting the cylinder jackets with the upper reservoir and with the lower reservoir, whereby a circulation of water may be maintained through the jackets, through the pipes, a vertical stack connected with the upper reservoir above the central opening thereof for causing a draft of air from the said central space along the lines parallel to the pipes, whereby air is caused to move inward between the pipes to replace the air withdrawn from the central space.

7. In a tractor, the combination with a frame and supporting wheels of an internal combustion engine mounted on the frame and provided with cylinders having cooling jackets, a plurality of vertical cooling pipes each of relatively small diameter grouped about an unobstructed central vertical space and freely exposed to the normal atmosphere in all directions, a reservoir with which all of the pipes are connected at their lower ends, an annular reservoir with which all of the pipes are connected at their upper ends, water conducting means for connecting the cylinder jackets with the upper reservoir and with the lower reservoir, whereby a circulation of water may be maintained through the jackets, through the reservoirs and through the pipes, a vertical stack connected with the upper annular reservoir above the central opening thereof, an annular exhaust head located in the stack and provided in its upper wall with a plurality of peripherally arranged openings, a pipe connected with the exhaust ports of the engine, and with the exhaust head for conducting the exhaust gases into the stack to cause a draft of air from the said central space along lines parallel to the pipes whereby air is caused to move inward between the pipes to replace the air withdrawn from the central space.

In testimony whereof, I affix my signature, in presence of two witnesses.

JOHN B. BARTHOLOMEW.

Witnesses:
J. M. CALDWELL,
A. L. GREGORY.